March 14, 1961 L. C. FRIEND 2,975,249

SNAP-ACTION SWITCH

Filed May 4, 1960 3 Sheets-Sheet 1

INVENTOR

LINDSAY C. FRIEND

BY K. G. Doub

ATTORNEY

March 14, 1961 L. C. FRIEND 2,975,249

SNAP-ACTION SWITCH

Filed May 4, 1960 3 Sheets-Sheet 2

INVENTOR

LINDSAY C. FRIEND

BY K. G. Doub

ATTORNEY

March 14, 1961 L. C. FRIEND 2,975,249

SNAP-ACTION SWITCH

Filed May 4, 1960 3 Sheets-Sheet 3

INVENTOR

LINDSAY C. FRIEND

BY K. G. Doub

ATTORNEY

United States Patent Office 2,975,249
Patented Mar. 14, 1961

2,975,249

SNAP-ACTION SWITCH

Lindsay C. Friend, Lutherville, Md., assignor to The Bendix Corporation, Towson, Md., a corporation of Delaware Filed May 4, 1960, Ser. No. 26,749
8 Claims. (Cl. 200—67)

This invention relates to electrical switches of that type in which a toggle link and coacting spring, or the equivalent of these parts, function to quickly move or snap a switch blade or analogous switching member to alternate contact "make" and/or "break" positions.

One of the disadvantages of prior known switches of this type is that they employ over-centering spring mechanism wherein the actuating differential and contact pressures are directly related. Thus, a switch having a low differential travel will exert a low contact pressure with resultant low current capacity, or vice versa. A further disadvantage of such switches is that contact pressure decreases substantially to zero as the over-centering point is approached, and are also small immediately following snap-over. This materially limits the vibration and shock-resistance characteristics of the switch.

An object of the invention, therefore, is to provide a switch having a quick switching action while at the same time the differential travel and contact pressures or forces are functions which may be determined independently of one another according to their respective design parameters.

Another object is to provide a switch of the type specified having a more favorable ratio of differential-to-capacity than is possible with prior known over-centering spring type switches. The word "capacity" in this instance refers to the current or amperage rating of the switch.

Another object is to provide a quick-acting switch having improved vibration and shock-resistant characteristics.

Another object is to provide a switch of the type specified in which erosion of contact surfaces does not affect the snap-over point of the switching element.

A further object is to provide a switch having the above enumerated advantages yet capable of being miniaturized for use in restricted-space installations, for example, in sealed pressure switch units responsive to changes in altitude.

The structural embodiment of the switch as illustrated in Figs. 1 to 7, inclusive, of the drawings consists in general of an elongated switch blade mounted to pivot bodily about its intermediate transverse axis and carrying at its one end (herein considered as its front end), a pair of oppositely disposed contacts movable to alternate switching positions against coacting relatively fixed circuit make and/or break contacts. The blade is provided with an elongated central opening to accommodate what is herein identified as a toggle link (or "throw" link) and associated toggle spring, the latter functioning to snap the blade to alternate switching positions across the snap-over or throw line of the blade when the link is tilted by an actuating force to a predetermined angular position in the direction of blade throw. The link is secured to a leaf spring or like flexible member having a slot to receive a movable part of the blade, the said leaf spring causing the link to exert a frictional stabilizing force on the blade. Preferably, the leaf spring tilts or rocks bodily with the link, although it could perform its function by simply flexing with the link. When the link and leaf spring assembly has been tilted to a predetermined angular position with respect to the blade, it comes up against a stop, whereupon a slight additional tilting movement of the link frees it from frictional locking engagement with the switch blade and the latter is snapped by the togle spring into either one or the other its alternate switching positions.

The foregoing and other objects and advantages will become apparent in view of the following description taken in conjunction with the drawing wherein.

Figures 6, 8, 8A:
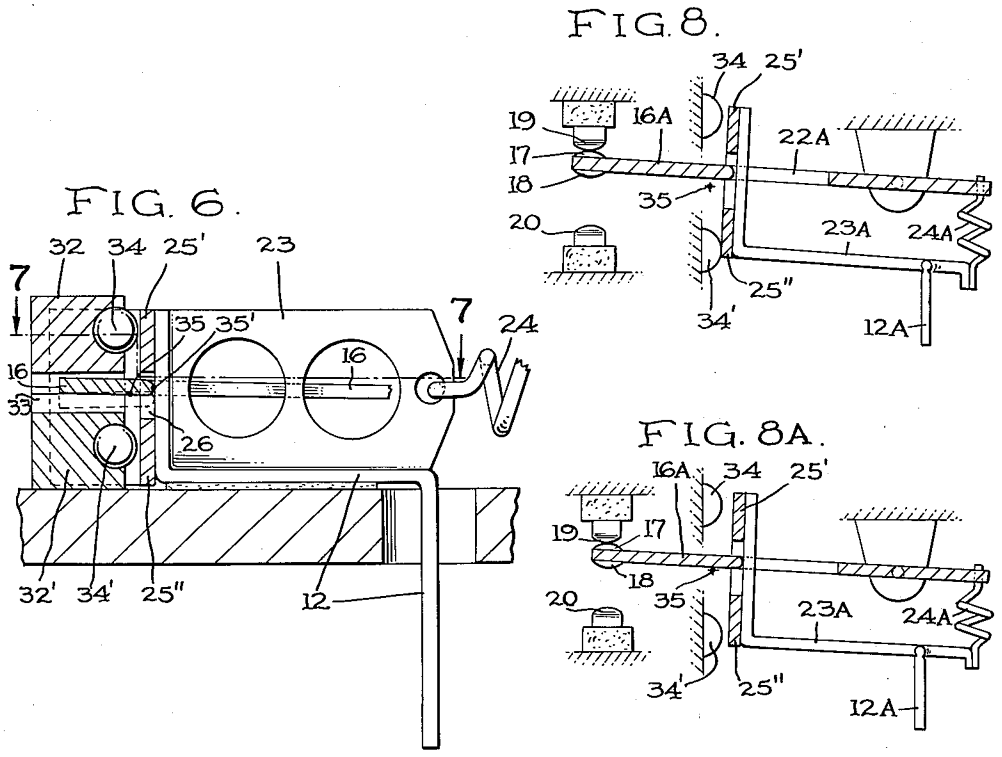
Fig. 6 is a greatly enlarged section taken substantially on the line 6—6, Fig. 5, showing the toggle link and coacting parts in an intermediate position.
Figure 8B:
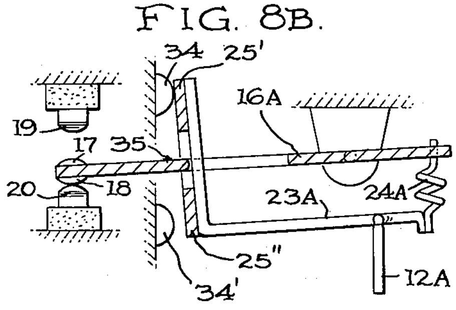

Figs. 7A to 7D, inclusive, are diagrammatic representations of the toggle link and blade-locking pivot spring assembly showing the positions taken by these parts during a switching cycle;

Fig. 8 is a generally schematic view of a different version of the switch of Figs. 1 to 7, inclusive, and Figs. 8A and 8B are views similar to Fig. 8 but showing the positions taken by the parts during a switching cycle.

Referring to the drawings in detail and first to Figs. 1 to 7, inclusive, the switch components are mounted on a base 10. The illustrated embodiment is a pressure-responsive switch which responds to the differential developed across a diaphragm 11, secured to the outer peripheral edge of said base, said diaphragm when flexed in response to changes in ambient air pressure, exerting a switching force on the outer end of an actuator link 12. A pair of transversely-spaced frame members in the form of elongated blocks 13 and 13' are anchored to the base 10. The front end surface of each block is grooved to receive laterally or transversely-projecting pivotal knife edges 15 and 15', formed on a switching member in the form of a blade 16, which may be stamped from copper sheeting or like material. In practice the blade is substantially rigid although a switching member having a limited amount of flexibility may be preferred in certain types of switches. At its one end (herein considered its front end) the blade carries a pair of contacts 17 and 18, which coact with a pair of spaced fixed circuit make and/or break contacts 19 and 20. The contact 19 is secured to and insulated from a top frame plate 21, while the contact 20 is mounted on and insulated from the base 10.

The central portion of the switch blade 16 is provided with an elongated opening 22, to accommodate a switch throw assembly which in Figs. 1 to 7, inclusive, takes the form of a toggle link 23 and associated toggle spring 24. The rear edge of the link 23 is secured, as by welding, to a resilient blade-locking member in the form of a generally U-shaped spring 25 of the leaf type, note Fig. 4A. The rear edge of the switch blade projects through a slot 26 formed in said spring, and the rear edge of the link 23 is urged by spring 25 into frictional engagement with the contiguous edge of said blade when the link is in certain of its alternate switching positions, as will be more fully hereinafter explained. The intermediate transverse portions of the spring 25 on opposite sides of the slot 26 are designated 25' and 25'' in Figs. 4A, 6 and 7A–7D to simplify the operational description.

Figure 1:
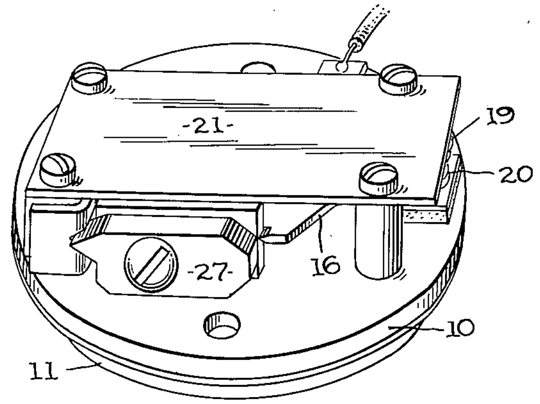
Fig. 1 is an enlarged perspective view of a switch in accordance with the invention.
Figures 2, 3, 5:
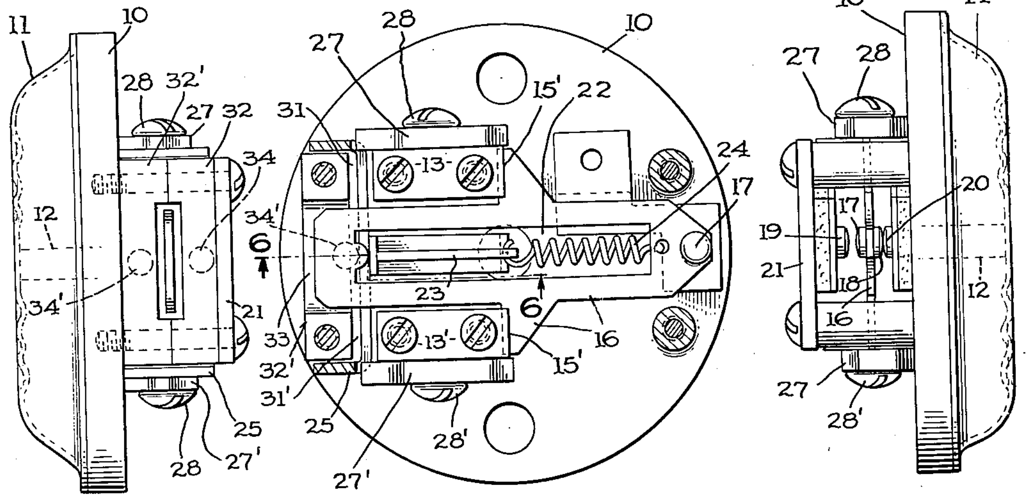
Figs. 2, 3 and 4 are, respectively, views in front, rear and side elevations of the switch of Fig. 1.
Fig. 5 is a section taken substantially on the line 5—5, Fig. 4.
Figure 4:
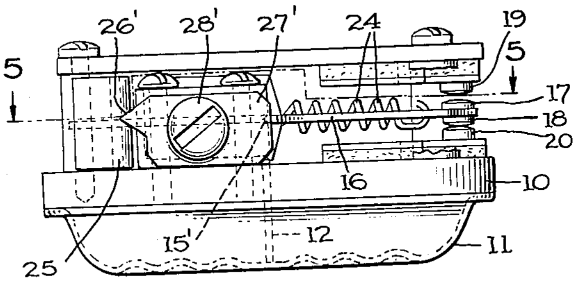
Figure 4A:
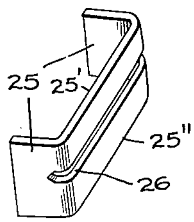
Fig. 4A is a detail view of a so-called switch blade frictional locking spring.

At its opposite extremities, where it bends in a right-angular direction, the slot 26 in the spring 25 terminates in pivot notches to receive the knife edges of pivot blocks 27 and 27', compare Figs. 4A and 5, secured to the frame blocks 13 and 13' by means of screws 28 and 28', which project through elongated slots formed in the pivot blocks, to permit a limited range of adjustment for the link and pivot spring assembly. It will be seen that when an actuating force of sufficient magnitude is applied to the pivot spring 25 and/or toggle link 23, it will rock the said spring and link bodily in a switch-throwing direction. Spring 25 passes through a pair of transversely-aligned or registering slots or spaces 31 and 31', located between the rear end of the frame blocks 13, 13' and the contiguous opposite end surfaces of a pair of rear frame members 32 and 32', which mate to define a rear frame section having an intermediate U-shaped recess 33, note Figs. 5 and 6, which receives the rear extremity of the switch blade 16. The forwardly-facing surface of each of the rear frame members 32 and 32' are recessed at an intermediate point, to accommodate stops shown in the form of spherical elements or balls 34 and 34', located in the frame members 32 and 32' on opposite sides of the pivotal point of the link and leaf spring assembly for contact by the opposite side portions 25' and 25'' of the pivot spring 25.

*Operation*

Figure 7:
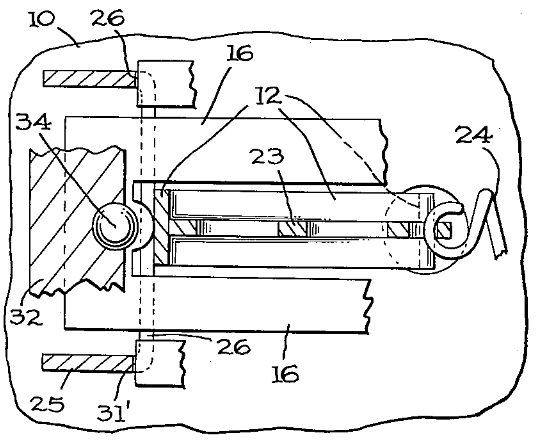
Fig. 7 is a view taken substantially on the line 7—7, Fig. 6.
Figure 7A:
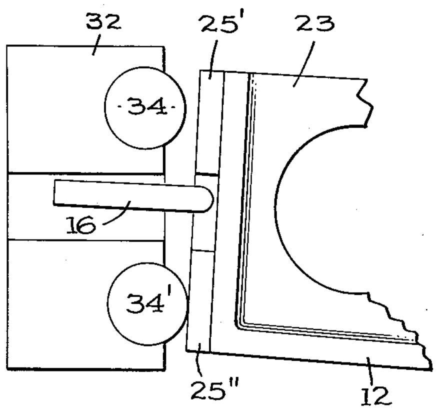

Figs. 7A to 7D, inclusive, taken in conjunction with Figs. 6 and 7 illustrate the respective positions taken by the pivot spring 25, toggle link 23, and switch blade 16 during a switching cycle. In Fig. 7A, the contact 18 is assumed to be closed against contact 20. To do this, a switching force was applied to the actuator 12 in a downward or clockwise direction as viewed in Figs. 4 and 6 of the drawings, tilting toggle link 23 and pivot spring 25 bodily clockwise just beyond the point where the one side of 25'' of the spring 25 came up against the stop 34', freeing the frictional lock between the rear inwardly-facing edge of the blade 16 and the adjacent surface of the actuator 12, to which the rear and one side edge of the link 23 is secured. When this happened, the blade was snapped to contact position by the biasing pull of the toggle spring 24. If the actuating force remains applied after the blade has been thrown, i.e., it is a slow or gradual differential travel in contradistinction to a momentarily applied force, the spring 25 and link 23 will remain tilted as in Fig. 7A and hence the frictional lock will remain broken, but since the toggle spring 24 now applies its maximum biasing pull or force in a clockwise direction on the blade 16, the latter will be stabilized in its contact position.

Figure 7C:
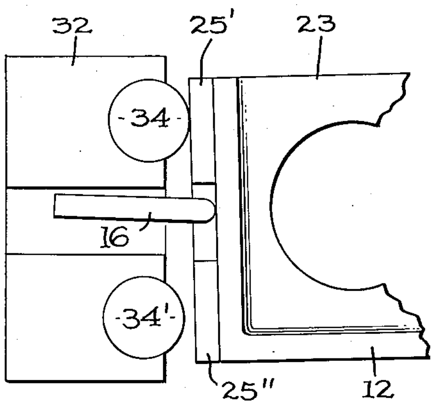
Figure 7B:
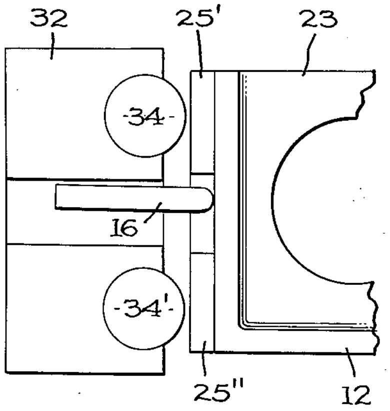

Fig. 7B shows the position of the principal moving parts of the switch assembly (link 23, blade 16 and pivot spring 25), when the clockwise actuating force has been removed. Link 23 and spring 25 are tilted back to the point where the one side 25'' of the spring 25 is freed from engagement with the stop 34' and said spring has thrust the actuator against the rear inner edge of the blade, re-establishing the frictional lock with contacts 18 and 20 still engaged; and even though the contact-holding force of the toggle spring 24 has decreased, the blade will still strongly resist vibrational forces tending to break contact. The positions in Fig. 7B are approximately those taken at an intermediate point in the actuating differential.

Any decrease in contact pressure which might come about through minute shifts in the position of the switch blade as the toggle spring force changes direction, is offset as follows:

Note that the rotational axis (indicated at 35 in Fig. 6) of the actuating link 12 is located a short distance rearward from the point 35' of frictional engagement between the link and the switch blade 23. Thus, as the link 12 is rotated during actuation of the switch, the switch blade also tends to be rotated (through a very small angle), but in an opposite sense to the angular displacement of the link. Actually, substantially no blade rotation takes place, the practical effect being a slight slippage of the switch blade with respect to the link. This slippage is in the opposite sense from any that might be caused by the pull of the toggle spring 24, the two effects thereby cancelling one another. Hence, it is possible, by a suitable choice of the distance between the link axis 35 and the point 35' to guarantee contact pressures greater than predetermined minimum throughout the operating cycle.

Fig. 7C shows the position of the moving parts of the switch just about the time of snap-over to the alternate contact position. Here the actuating differential applied to the link 23 in a counterclockwise direction has tilted the link and its pivot spring 25 to a point where the side portion 25' of the pivot spring came up against the stop 34.

Figure 7D:
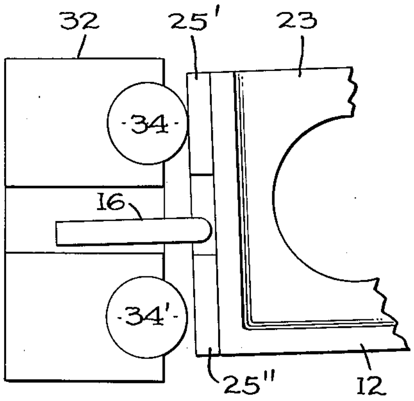

Fig. 7D shows the parts just after snap-over has taken place. At this point the frictional lock between the switch blade and link 12 has been broken and the parts will quickly assume positions diametrically opposite to those of Fig. 7A.

If the actuating or switch-throwing force is only momentarily applied and then released and not immediately applied in the opposite direction, the parts will assume the positions shown in Fig. 6 following closure of the contacts, at which time the frictional lock is applied, strongly resisting vibrational displacement of the blade. This is due to the fact that the spring 25 is free to thrust the friction surface of the actuator 12 against the rear inner edge of blade 16. Obviously, the actuator 12 need not be extended over the rear edge of the link 23, in which event the rear inner edge of the blade 16 would frictionally engage the contiguous rear edge of the link; or the actuator could be simply pivotally connected to the link 23.

*Figs. 8, 8A and 8B*

In Fig. 8 the parts of the switch which are identical to those of like parts in Figs. 1 to 7, inclusive, are identified by similar reference numerals, and those parts which are modified with respect to, but function in the same manner as, analogous parts in Figs. 1 to 7 are given corresponding reference numerals with the addition of the letter "A."

In this instance, the so-called toggle or throw link of Figs. 1 to 7, inclusive, is in the form of an angular throw link 23A and the spring 25 is secured to the foot portion of this lever. The switch blade is more in the nature of an arm indicated at 16A, and the so-called toggle or throw spring is indicated at 24A. However, in Fig. 8 the throw spring does not have a toggle action; it simply compresses and distends in response to counterclockwise and clockwise movement of the throw link 23A.

Figs. 8, 8A and 8B clearly illustrate the operation. In Fig. 8 the actuator link 12A has been pulled downwardly, rocking the throw link 23A clockwise slightly beyond the point where the one side 25'' of the friction spring 25 engaged the stop 34'. This relieved the foot portion of link 23A from frictional or braking engagement with the contiguous edge of the blade 16A. However, since the biasing force of the spring 24A is relatively great, the contact force is firm and will strongly resist vibration.

In Fig. 8A the link 23A is being rotated counterclockwise to a point where the side 25'' of the spring 25 has moved away from the stop 34'. Now the spring 25 is free to urge the foot portion of the link 23A into frictional braking engagement with the contiguous edge of the link 16A. Thus contact pressure between the contacts 17 and 19 is still firmly maintained even though the spring 24A may be compressed to almost the snap-over point.

In Fig. 8B the parts are in the opposite or alternate contact position with respect to that shown in Fig. 8. Here the side 25′ of the spring 25 has engaged the stop 34 and the link 23A has been rotated slightly beyond this point, again freeing the foot portion of the link 23A from frictional engagement with the inner edge of the blade 16A and permitting the spring 24A to perform its snap-over function.

From the foregoing it will be seen that the improved switch incorporates the advantages of a quick snap action to contact make and/or break positions while at the same time contact pressure remains firm and does not weaken as the over-centering point of the switch blade is approached and passed; and this also holds true following snap-over to the alternate contact position. This being so, the differential travel and contact pressures of the switch are functions which are substantially independent of one another and may be determined according to their respective design parameters.

The switch may be made very small and compact, Figs. 1 to 6, inclusive, of the drawing being enlarged to about twice the size of a production prototype adapted for a particular type of installation. It will be apparent that the switch may be modified structurally other than as shown to adapt it for different installations, without departing from the scope of the invention as defined by the appended claims.

What I claim is:

1. In a switch, a pair of spaced contacts, a switching member having contact surfaces adapted to coact with said spaced contacts, means mounting said member for limited angular movement about a fixed pivot to alternate contact positions, a switch throw member mounted to tilt in a plane substantially parallel to the plane of movement of said switching member, a spring connecting said throw member to said switching member in a manner such as to bias the switching member toward contact engaging position with one or the other of said spaced contacts when the throw member has been tilted to a given throw angle with respect to the switching member, means for applying an actuating force on said throw member to tilt the latter, coacting friction surfaces carried by said switching member and said throw member, means coacting with said throw member to maintain said surfaces in engagement and thereby produce a frictional stabilizing drag on the switching member, and means functioning to substantially disengage said surfaces from one another when said throw member has been tilted to a given angle and permit the said spring to snap the switching member to either one of its alternate positions with respect to said spaced contacts.

2. In a switch, a pair of spaced contacts, a switching member having contact surfaces adapted to coact with said spaced contacts, means mounting said switching member for limited angular movement about a fixed pivot to alternate contact positions, a switch throw member mounted to tilt in a plane substantially parallel to the plane of movement of said switching member, a spring connecting said throw member to said switching member in a manner such as to bias the switching member towards contact-engaging position with one or the other of said spaced contacts when the throw member has been tilted to a given throw angle with respect to said switching member, a switch actuator connected to said throw member to tilt the latter in response to a switching force, spring means functioning to create a frictional drag between said throw member and switching member to stabilize the latter, and means for relieving the frictional drag when the throw member has been tilted to a given throw angle to permit the spring to snap the switching member to either one of its alternate switching contact-make positions with respect to said spaced contacts.

3. In a switch, a pair of spaced contacts, a switching member such as a switch blade having contact surfaces adapted to coact with said spaced contacts, means mounting said blade for limited pivotal movement about a fixed pivot point to alternate contact positions, a switch throw link and coacting spring member mounted to tilt bodily in a plane substantially parallel to the plane of movement of said blade, coacting friction surfaces carried by said blade and link, said spring member functioning to set up a frictional braking engagement between said surfaces to stabilize the blade, means for applying a tilting force on said link to tilt the latter, stop means so located that when the link and its spring have been tilted to a given throw angle the frictional brake is relieved, and a spring arranged to snap said blade to contact-engaging position when the blade is unbraked.

4. In a switch, a pair of spaced contacts, a switching member such as a switch blade having contact surfaces adapted to coact with said spaced contacts, said blade being supported at an intermediate point for angular movement to alternate contact positions, a switch throw link, a friction spring member connected to said link, said link and spring being mounted to tilt bodily in a plane substantially parallel to the plane of movement of said blade, coacting friction surfaces responsive to movement of said blade and link, said spring tending to maintain said surfaces in braking engagement to stabilize the blade, a throw spring connecting the link to said blade in a manner such as to bias the blade towards either one or the other of said spaced contacts when the link has been tilted to a given throw angle with respect to said blade, an actuator connected to said link, stop means arranged for engagement by said link and its associated spring when the link has been tilted to a predetermined angle, further tilting movement of said link freeing said frictional surfaces from engagement whereupon said throw spring snaps the blade to either one of its alternate positions with respect to said spaced contacts.

5. In a switch, a pair of spaced contacts, an elongated switch blade having contact surfaces adapted to coact with said spaced contacts, means mounting said blade for angular movement about a fixed pivot to alternate contact positions, said blade having an opening extending longitudinally thereof, a switch throw link located in said opening, a friction spring secured to said link, frictional braking surfaces carried by contiguous portions of said blade and link, said spring functioning to support said link for limited angular or tilting movement in the direction of blade throw and to also urge said friction surfaces into braking engagement, a throw spring interconnecting the blade and link and arranged to exert a biasing force on said blade towards either one or the other of its alternate contact positions when the link has been tilted to a given angle with respect to the blade, an actuator connected to said link, and stop means located in the path of angular travel of said link and becoming effective when the link has been tilted beyond a predetermined angle to relieve the braking friction and permit the throw spring to snap the blade to either one of its alternate contact positions.

6. A switch as claimed in claim 5 wherein said friction spring is in the form of a leaf spring mounted to pivot bodily with the said link.

7. A switch as claimed in claim 5 wherein said friction spring is in the form of a leaf spring secured to the link and is formed with a slot through which the blade projects.

8. A switch as claimed in claim 5 wherein said friction spring is in the form of a leaf spring which is secured to one end of said link and said throw spring is in the form of a coil spring which connects the opposite end of said link to said blade.

No references cited.